US008725135B2

(12) United States Patent
Weyl et al.

(10) Patent No.: US 8,725,135 B2
(45) Date of Patent: May 13, 2014

(54) SYSTEM AND METHOD FOR USING A MOBILE TERMINAL IN A MOTOR VEHICLE FOR UPDATING THE SOFTWARE OF ON-BOARD COMPUTERS

(75) Inventors: Daniel Weyl, Munich (DE); Karl-Ernst Steinberg, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1567 days.

(21) Appl. No.: 11/808,910

(22) Filed: Jun. 13, 2007

(65) Prior Publication Data

US 2007/0287439 A1    Dec. 13, 2007

Related U.S. Application Data

(63) Continuation of application No. PCT/EP2004/014215, filed on Dec. 14, 2004.

(51) Int. Cl.
  *H04L 12/58*  (2006.01)
  *H04M 1/725*  (2006.01)
  *G01M 17/00*  (2006.01)
  *G06F 7/00*  (2006.01)
  *G06F 17/00*  (2006.01)

(52) U.S. Cl.
  USPC .................. 455/420; 455/412.1; 701/31.5

(58) Field of Classification Search
  USPC .............. 455/66.1, 420, 554.2, 412.1, 569.2;
                   701/29, 35, 36, 207, 29.1–34.4
  See application file for complete search history.

(56) References Cited

U.S. PATENT DOCUMENTS

| 5,442,553 | A  |   | 8/1995  | Parrillo              |
|-----------|----|---|---------|-----------------------|
| 5,737,711 | A  | * | 4/1998  | Abe .............. 701/33.4 |
| 6,023,232 | A  | * | 2/2000  | Eitzenberger ...... 340/988 |
| 6,487,717 | B1 |   | 11/2002 | Brunemann et al.      |
| 6,622,083 | B1 | * | 9/2003  | Knockeart et al. ....... 701/202 |

(Continued)

FOREIGN PATENT DOCUMENTS

| DE | 10243093 A1 * | 3/2004 |
| EP | 1 128 265 A1  | 8/2001 |
| EP | 1 324 197 A1  | 7/2003 |
| WO | WO 02/063464 A2 | 8/2002 |

OTHER PUBLICATIONS

International Search Report dated Aug. 12, 2005 including English translation (Six (6) pages).

(Continued)

*Primary Examiner* — Ariel Balaoing
*Assistant Examiner* — Larry Sternbane
(74) *Attorney, Agent, or Firm* — Crowell & Moring LLP

(57) ABSTRACT

A system for using at least one mobile terminal in a motor vehicle, such as a passenger automobile or a two-wheeled vehicle in particular, having the at least one mobile terminal and a communication interface between the motor vehicle and the mobile terminal is provided. A software version transmission device transmits a software version message indicating which sequence controllers and/or control unit data are stored and/or installed in one or more control units of the motor vehicle. The software version message is analyzed to ascertain whether the vehicle-external download device has one or more current sequence controllers and/or control unit data ready for downloading, which are downloaded via a communication link and stored in the mobile terminal. An updating device stores and/or installs the sequence controllers and/or control unit data stored in the mobile terminal in the at least one affected control unit.

18 Claims, 2 Drawing Sheets

(56) References Cited

U.S. PATENT DOCUMENTS

Figure 1:
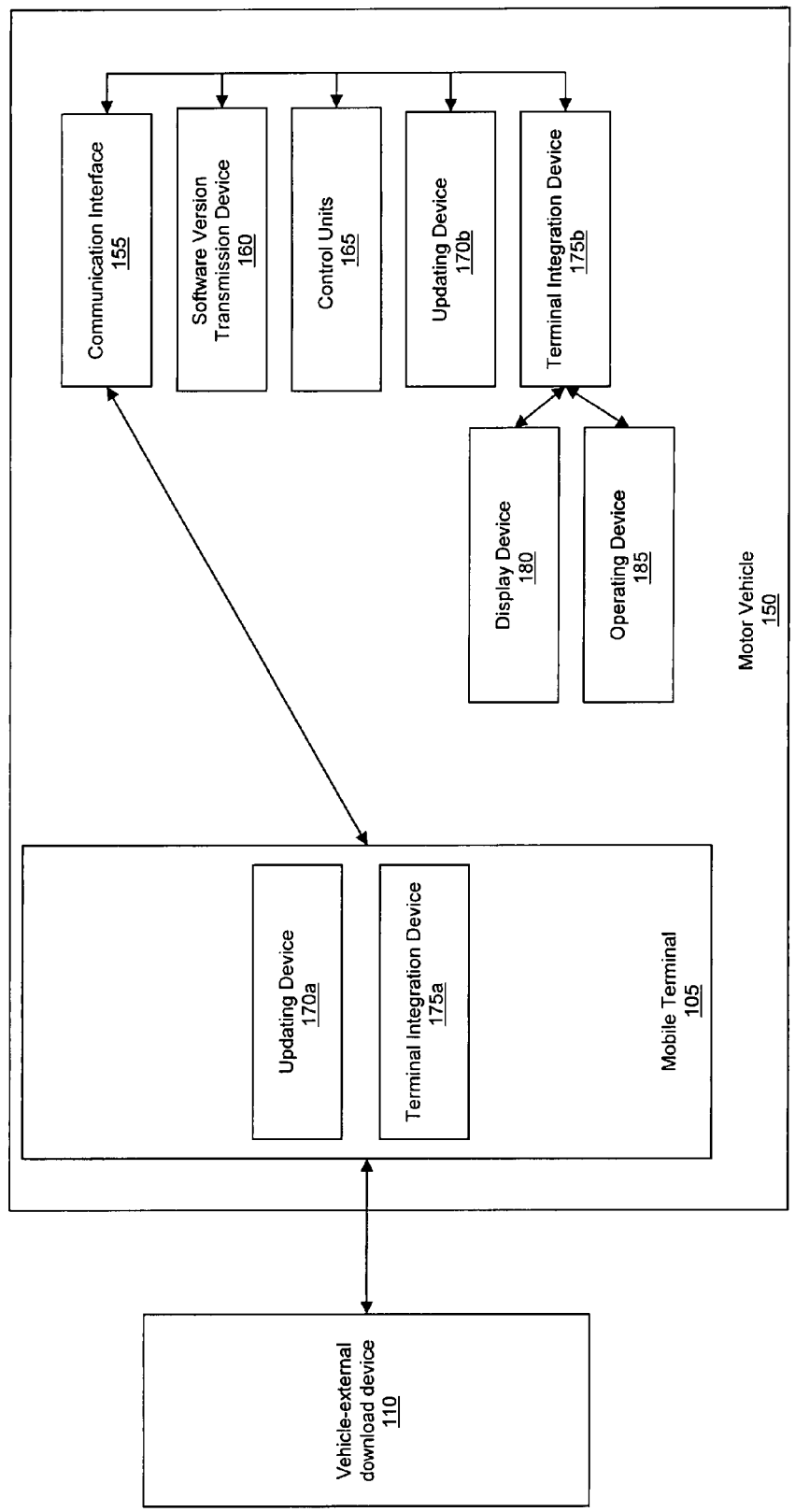

| | | | |
|---|---|---|---|
| 6,687,587 B2* | 2/2004 | Kacel | 701/33 |
| 6,775,642 B2* | 8/2004 | Remboski et al. | 702/185 |
| 6,987,964 B2* | 1/2006 | Obradovich et al. | 455/414.1 |
| 7,191,040 B2* | 3/2007 | Pajakowski et al. | 701/1 |
| 7,366,589 B2* | 4/2008 | Habermas | 701/1 |
| 7,502,353 B2* | 3/2009 | Bolz | 370/338 |
| 2002/0035429 A1* | 3/2002 | Banas | 701/115 |
| 2003/0128103 A1* | 7/2003 | Fitzpatrick et al. | 340/425.5 |
| 2003/0188303 A1 | 10/2003 | Barman et al. | |
| 2004/0044454 A1* | 3/2004 | Ross et al. | 701/33 |
| 2004/0054444 A1* | 3/2004 | Abeska et al. | 701/1 |
| 2004/0137892 A1* | 7/2004 | Hanood | 455/418 |
| 2004/0214599 A1* | 10/2004 | Ogino | 455/556.1 |
| 2004/0259633 A1* | 12/2004 | Gentles et al. | 463/29 |
| 2005/0015380 A1* | 1/2005 | Burkhardt et al. | 707/100 |
| 2005/0060069 A1* | 3/2005 | Breed et al. | 701/29 |
| 2005/0065779 A1* | 3/2005 | Odinak | 704/201 |
| 2005/0102661 A1 | 5/2005 | De Boer et al. | |

OTHER PUBLICATIONS

PCT/IB/373 and PCT/ISA/237 including English translation of the pertinent portion (Eight (8) pages).

* cited by examiner

SYSTEM AND METHOD FOR USING A MOBILE TERMINAL IN A MOTOR VEHICLE FOR UPDATING THE SOFTWARE OF ON-BOARD COMPUTERS

CROSS REFERENCE TO RELATED APPLICATIONS

This application is a continuation of PCT International Application No. PCT/EP2004/014215, filed Dec. 14, 2004 the entire disclosure of which is herein expressly incorporated by reference.

BACKGROUND OF THE INVENTION

Exemplary embodiments of the present invention relate to a system for using at least one mobile terminal in a motor vehicle.

A mobile telephone can communicate via the short-range wireless system Bluetooth with the vehicle, and a telephone conversation can be conducted via the hands-free facility of the vehicle. A so-called "mobile integration unit" of the vehicle accesses the telephone numbers of the mobile telephone and allows them to be displayed on a display of the vehicle. An operating device of the human-machine interface of the vehicle allows the numbers stored in the mobile telephone to be dialed. The menu design and the menu control on the display installed in the vehicle is determined by a sequence controller and/or program controller provided in the vehicle.

SUMMARY OF THE INVENTION

Exemplary embodiments of the present invention provide improved systems and methods for using mobile terminals in a motor vehicle. An exemplary system includes at least one mobile terminal and a motor vehicle, coupled to the at least one mobile terminal by a communication interface. The system also includes a software version transmission device, in the motor vehicle, that is arranged to transmit a software version message.

The software version transmission device specifies which sequence controllers and/or control unit data are to be stored and/or installed in one or more control units of the motor vehicle. The software version message is transmitted to the mobile terminal and/or to a vehicle-external download device by the software version transmission device. The software version message is analyzed to ascertain whether the vehicle-external download device has one or more current sequence controllers and/or control unit data ready for downloading. The one or more more current sequence controllers and/or control unit data are downloaded via a communication link and the downloaded sequence controllers and/or control unit data are stored in the mobile terminal. The system also includes an updating device 170, which stores and/or installs the sequence controllers and/or control unit data stored in the mobile terminal in the at least one affected control unit.

Other objects, advantages and novel features of the present invention will become apparent from the following detailed description of the invention when considered in conjunction with the accompanying drawings.

BRIEF DESCRIPTION OF THE DRAWING FIGURES

Figure 2:
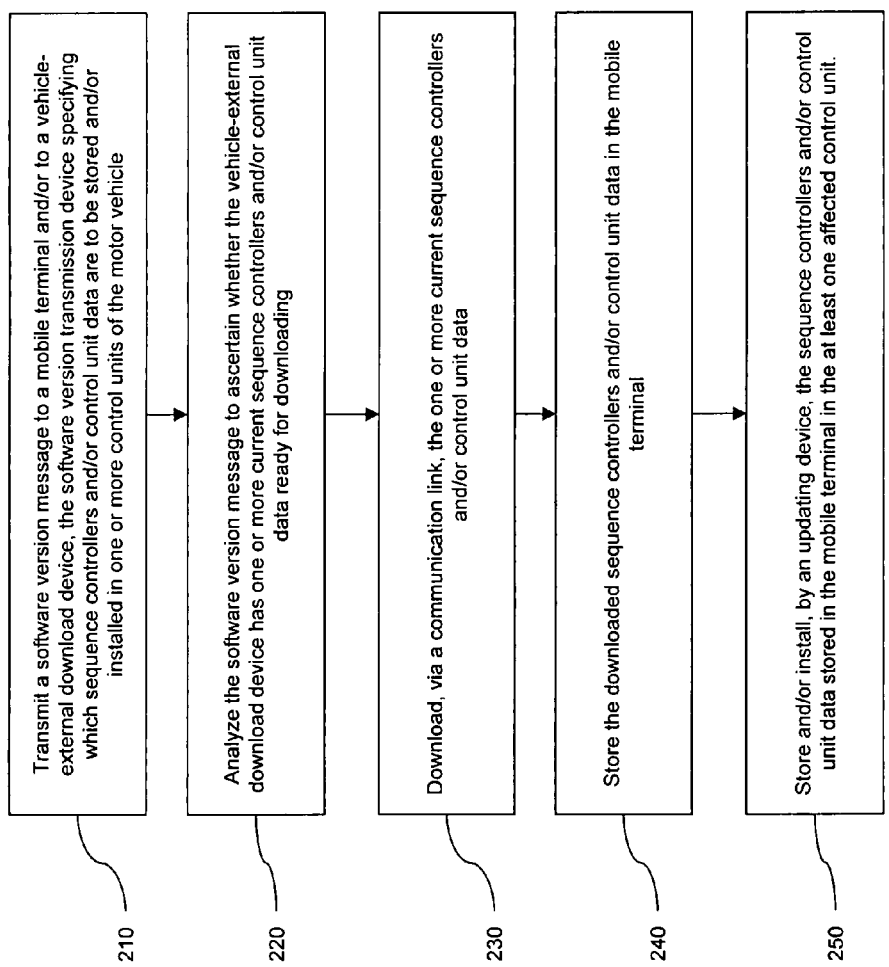

FIG. 1 is a block diagram of an exemplary system in accordance with the present invention; and FIG. 2 is a flow diagram of an exemplary method in accordance with the present invention.

DETAILED DESCRIPTION

FIG. 1 is a block diagram of an exemplary system in accordance with the present invention. Motor vehicle 150 is coupled to mobile terminal 105 by way of communication interface 155. Motor vehicle 150 includes a software version transmission device 160 for transmitting a software version message, which specifies which sequence controllers and/or control unit data are stored and/or installed in one or more control units 165 of the motor vehicle 150. The software version message is transmitted to the mobile terminal 105 and/or to a vehicle-external download device 110 by the software version transmission device 160. The software version message is analyzed to ascertain whether the vehicle-external download device 110 has one or more more current sequence controllers and/or control unit data ready for downloading. The one or more more current sequence controllers and/or control unit data are downloaded via a communication link and the downloaded sequence controllers and/or control unit data are stored in the mobile terminal 105. An updating device 170 stores and/or installs the sequence controllers and/or control unit data stored in the mobile terminal 105 in the at least one affected control unit.

The systems and methods according to the present invention advantageously allow the use of a mobile terminal 105 present in the motor vehicle 150 in the framework of a so-called "teleservice," in which the software present in one or more control units 165 of the vehicle 150 is partially or completely updated and/or replaced or supplemented. According to the present invention, the software can be for one or more sequence controllers and/or data of the control unit, such as a so-called operating map.

In one aspect of the present invention, the mobile terminal 105 is a mobile telephone, a PDA or personal digital assistant, a notebook, or another mobile computer, such as a mobile entertainment device in particular.

In one aspect of the present invention, the mobile terminal 105 always or sometimes communicates via the Internet protocol (IP) in the framework of the updating. The Internet protocol particularly allows addressing on overlapping networks and suitable coupling of the mobile terminal 105 to the corresponding vehicle components and/or to the vehicle-external download device 110. Furthermore, the communication may be encrypted.

In one aspect of the present invention, the software version message is stored in the mobile terminal 105 and the mobile terminal 105 transmits the software version message to the vehicle-external download device 110. Therefore, the communication capability of the mobile terminal 105 may be used cost-effectively and an extra separate communication component for this purpose in the vehicle 150 may be dispensed with.

The software version transmission device 160 can be provided in the mobile terminal 105. Accordingly, the necessity of providing a corresponding component in the vehicle 150 is dispensed with, by which costs may be saved in particular. The vehicle-external download device 110 can be operated by the producer of the vehicle 150 or at the order of the vehicle producer, by which high security against manipulation may be achieved.

In accordance with exemplary embodiments of the present invention, the vehicle-external download device 110 analyzes the software version message and/or transmits the one or more more current sequence controllers and/or control unit data via a communication link, such as a broadband Internet link in particular, of the vehicle and/or of the domestic environment of the driver of the vehicle 150, for example, via UMTS, WLAN, GSM, or SMS, etc., directly or indirectly into the mobile terminal 105.

The one or more more current sequence controllers and/or control unit data are transmitted indirectly into the mobile terminal 105 with a PC or notebook interposed, which is connected in the domestic area to a broadband interconnection, such as a DSL connection in particular. This is advantageous in particular if the Internet connection of the vehicle 150 is significantly slower and/or significantly more expensive than the domestic Internet connection. Furthermore, this procedure may possibly be performed significantly more comfortably and/or more securely and/or more rapidly via a PC and its keyboard.

In one embodiment of the present invention, the updating device is provided in the mobile terminal 105 (updating device 170*a*) and/or in the vehicle 150 (updating device 170*b*). The updating device 170*a*, 170*b* can perform an authorization check and/or an authentication check of the one or more sequence controllers and/or the control unit data before updating the one or more sequence controllers and/or control unit data. The access may be limited and/or a fee-based access may be made possible by the authorization check. The potential danger of manipulation or falsification of the transmitted information may be significantly reduced by the authentication check.

In accordance with exemplary embodiments of the present invention, the authorization check and/or the authentication check is performed using the public key method (PKI).

In one aspect of the present invention, a hash algorithm is applied to the one or more sequence controllers and/or the control unit data by the download device. The hash value ascertained in this way is encrypted together with the one or more sequence controllers and/or the control unit data using a private key of the vehicle-external download device 110. The public key of the download device complementary to the private key is stored in the updating device 170*a*, 170*b*, and can be secured against falsification. The public key is used to decrypt the one or more sequence controllers and/or the control unit data and the hash value. The updating device 170*a*, 170*b* applies the hash algorithm to the one or more sequence controllers and/or the control unit data. The hash value ascertained in this way is compared to the hash value ascertained by the decryption and if the two hash values correspond, the authorization check and/or the authentication check is considered to be positively completed.

By using the known PKI system for the system according to the present invention, in particular falsification of the transmitted, updated software for the control units of the vehicle 150 may be effectively prevented without a new encryption system having to be provided for this purpose.

In one aspect of the present invention, the software version message is transmitted upon a technical error of vehicle 150, which results in particular in an entry in the error memory of a control unit. Alternatively or additionally, the software version message is transmitted by the software version transmission device 160 controlled by vehicle events and/or at predetermined time intervals.

In one aspect of the present invention, the software version message can be provided with vehicle error data, vehicle diagnostic data and/or information uniquely identifying the vehicle 150, i.e., vehicle ID information. The updating device 170*a*, 170*b* corrects one or more vehicle errors, in particular in the software of the control units, by storing and/or installing the one or more more current sequence controllers and/or the control unit data in the at least one affected control unit.

The reliability of a vehicle 150 may be significantly increased and/or an error may be corrected rapidly by updating the software through the cited measures. The transmitted vehicle diagnostic data and the transmitted vehicle ID information may support the selection of suitable software for updating and/or correcting errors on the part of the vehicle-external download device 110.

In one aspect of the present invention, the download device transmits a repair and/or maintenance message into the mobile terminal 105, and its content is communicated and/or displayed to the driver. These measures provide the driver with the ability to become aware and/or engaged in the procedure in a supporting role. If necessary, the driver may be requested to seek out a service station with his vehicle as soon as possible and/or is informed that a service vehicle is on the way to the vehicle 150.

In accordance with exemplary embodiments of the present invention, a display device 180 and an operating device 185 can be provided in the vehicle 150. A terminal integration device 175*a* or 175*b*, having a terminal sequence controller, can be provided in the mobile terminal 105 and/or in the vehicle 150, which calls up an operating and/or display interface for operating functions and/or software applications of the mobile terminal 105 on the vehicle display device and which is operated via the vehicle operating device.

The display device and operating device may effectively support the updating by the engagement and/or participation of the driver.

Finally, in accordance with exemplary embodiments of the present invention, the software version message is provided with information about the geographic position of the vehicle 150, i.e., location information, which is ascertained on the basis of a satellite receiver, in particular the GPS receiver of a navigation system provided in the vehicle 150 and/or in the mobile terminal 105. The location information may be used, for example, to be transmitted to a service vehicle which is to be sent to the vehicle 150. Furthermore, it may be ascertained on the basis of the location position, for example, which service station is located in proximity to the vehicle 150. The corresponding route may then be transmitted to the vehicle navigation system and the vehicle 150 may thus be guided to the appropriate service station.

The software version message can be first provided with the location information of the vehicle 150 when the driver of the vehicle 150 has authorized the system for this purpose by a manual and/or acoustic release. This measure helps to increase the acceptance for using the system according to the present invention in that data protection aspects are taken into consideration by the necessity of an authorization by the driver.

In the description of the system of FIG. 1 various elements have been described as performing certain functionality. These elements can perform the functionality by being arranged as an application specific integrated circuit (ASIC), field programmable gate array (FPGA) and/or microprocessor executing software code. Accordingly, the present invention includes logic for performing these functions, and this logic can be embodied in hardware and/or software.

FIG. 2 illustrates an exemplary method in accordance with the present invention. Initially, a software version transmission device in a motor vehicle 150 transmits a software version message to a mobile terminal 105 and/or to a vehicle-external download device 110 (step 210). The software version transmission device 160 specifies which sequence controllers and/or control unit data are to be stored and/or installed in one or more control units of the motor vehicle.

Next, the software version message is analyzed to ascertain whether the vehicle-external download device 110 has one or more current sequence controllers and/or control unit data ready for downloading (step 220). The one or more current sequence controllers and/or control unit data are downloaded via a communication link (step 230). The downloaded sequence controllers and/or control unit data are stored in the mobile terminal 105 (step 240). An updating device 170 stores and/or installs the sequence controllers and/or control unit data stored in the mobile terminal 105 in the at least one affected control unit (step 250).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system, comprising:
    at least one mobile terminal, wherein the mobile terminal is a mobile telephone, a personal digital assistant, a notebook computer, or a mobile entertainment device;
    a motor vehicle, coupled to the at least one mobile terminal by a communication interface;
    a software version transmission device provided in the mobile terminal and arranged to transmit a software version message,
    wherein the software version transmission device specifies which sequence controllers and/or control unit data are to be stored and/or installed in one or more control units of the motor vehicle,
    wherein the software version message is transmitted to the mobile terminal and to a vehicle-external download device by the software version transmission device upon a technical error of the vehicle, which results in an entry in the error memory of the control unit,
    wherein the software version message is analyzed to ascertain whether the vehicle-external download device has one or more current sequence controllers and/or control unit data ready for downloading,
    wherein the one or more current sequence controllers and/or control unit data are downloaded via a communication link and the downloaded sequence controllers and/or control unit data are stored in the mobile terminal, and
    wherein the system also includes an updating device, which stores and/or installs the sequence controllers and/or control unit data stored in the mobile terminal in at least one affected control unit.

2. The system according to claim 1, wherein the mobile terminal communicates with the motor vehicle via an Internet (IP) protocol.

3. The system according to claim 1, wherein the software version message is stored in the mobile terminal and the mobile terminal transmits the software version message to the vehicle-external download device, the vehicle-external download device being operated by the producer of the vehicle or by order of the vehicle producer.

4. The system according to claim 1, wherein the vehicle-external download device analyzes the software version message and/or the one or more current sequence controllers and/or control unit data are transmitted via a communication link, wherein the communication link is a UMTS, WLAN, GSM, or SMS communication link.

5. The system according to claim 4, wherein the one or more current sequence controllers and/or control unit data are transmitted indirectly into the mobile terminal with a PC or a notebook computer interposed, which is connected to a broadband Internet connection.

6. The system according to claim 1, wherein the updating device is provided in the mobile terminal and/or in the vehicle and the updating device performs an authorization check and/or an authentication check of the one or more sequence controllers and/or the control unit data before the updating of the one or more sequence controllers and/or control unit data.

7. The system according to claim 6, wherein the authorization check and/or the authentication check is performed using a public key technique.

8. The system according to claim 7, wherein a hash algorithm is applied to the one or more sequence controllers and/or the control unit data by the download device, and the hash value ascertained is encrypted together with the one or more sequence controllers and/or the control unit data using a private key of the vehicle-external download device, the public key of the download device complementary to the private key is stored in the updating device, the public key is used to decrypt the one or more sequence controllers and/or the control unit data and the hash value, the updating device applies the hash algorithm to the one or more sequence controllers and/or the control unit data, the hash value thus ascertained is compared to the hash value ascertained by the decryption, and if the two hash values correspond, the authorization check and/or the authentication check is considered to be completed positively.

9. The system according to claim 1, wherein the software version message is provided with vehicle error data, vehicle diagnostic data or information uniquely identifying the vehicle, and the updating device corrects one or more vehicle errors in the software of the control units, by storing and/or installing the one or more current sequence controllers and/or the control unit data in the at least one affected control unit.

10. The system according to claim 1, wherein the download device transmits a repair and/or maintenance message to the mobile terminal and its content is communicated to the driver in that the repair and/or maintenance message is displayed to the driver.

11. The system according to claim 1, wherein a display device and an operating device are provided in the vehicle, and a terminal integration device having a terminal sequence controller is provided in the mobile terminal and/or in the vehicle for operating functions or software applications of the mobile terminal on the vehicle display device and is operated via the vehicle operating device.

12. The system according to claim 1, wherein the software version message is provided with information about the geographic position of the vehicle, location information, which is ascertained on the basis of a GPS receiver of a navigation system provided in the vehicle and/or in the mobile terminal, the software version message is first provided with the location information of the vehicle when the driver of the vehicle has authorized the system for this purpose by a manual and/or acoustic release.

13. A method, comprising the acts of:
    transmitting, by a software version transmission device provided in a mobile terminal that is a mobile telephone, a personal digital assistant, a notebook computer, or a mobile entertainment device, a software version message to the mobile terminal and/or to a motor vehicle-external download device upon a technical error of the motor vehicle, which results in an entry in an error memory of a control unit, the software version transmission device specifying which sequence controllers and/or control unit data are to be stored and/or installed in one or more control units of the motor vehicle;

analyzing the software version message to ascertain whether the vehicle-external download device has one or more current sequence controllers and/or control unit data ready for downloading, downloading, via a communication link, the one or more current sequence controllers and/or control unit data;

storing the downloaded sequence controllers and/or control unit data in the mobile terminal, and storing and/or installing, by an updating device, the sequence controllers and/or control unit data stored in the mobile terminal in the at least one affected control unit.

14. The method according to claim 13, further comprising the acts of:

storing the software version message in the mobile terminal;

transmitting, by the mobile terminal, the software version message to the vehicle-external download device, the software version transmission device being provided in the mobile terminal and the vehicle-external download device being operated by the producer of the vehicle or by order of the vehicle producer.

15. The method according to claim 13, further comprising the act of:

performing an authorization check and/or an authentication check of the one or more sequence controllers and/or the control unit data before the updating of the one or more sequence controllers and/or control unit data.

16. The method according to claim 15, wherein the authorization check and/or the authentication check is performed using a public key technique.

17. The method according to claim 16, further comprising the acts of:

applying a hash algorithm to the one or more sequence controllers and/or the control unit data by the download device to ascertain a hash value; and encrypting the hash value ascertained together with the one or more sequence controllers and/or the control unit data using a private key of the vehicle-external download device, the public key of the download device complementary to the private key is stored in the updating device, the public key is used to decrypt the one or more sequence controllers and/or the control unit data and the hash value, the updating device applies the hash algorithm to the one or more sequence controllers and/or the control unit data, the hash value thus ascertained is compared to the hash value ascertained by the decryption, and if the two hash values correspond, the authorization check and/or the authentication check is considered to be completed positively.

18. The method according to claim 13, wherein the software version message is provided with vehicle error data, vehicle diagnostic data or information uniquely identifying the vehicle, and the updating device corrects one or more vehicle errors in the software of the control units, by storing and/or installing the one or more current sequence controllers and/or the control unit data in the at least one affected control unit.

* * * * *